Figures 1, 2, 3:
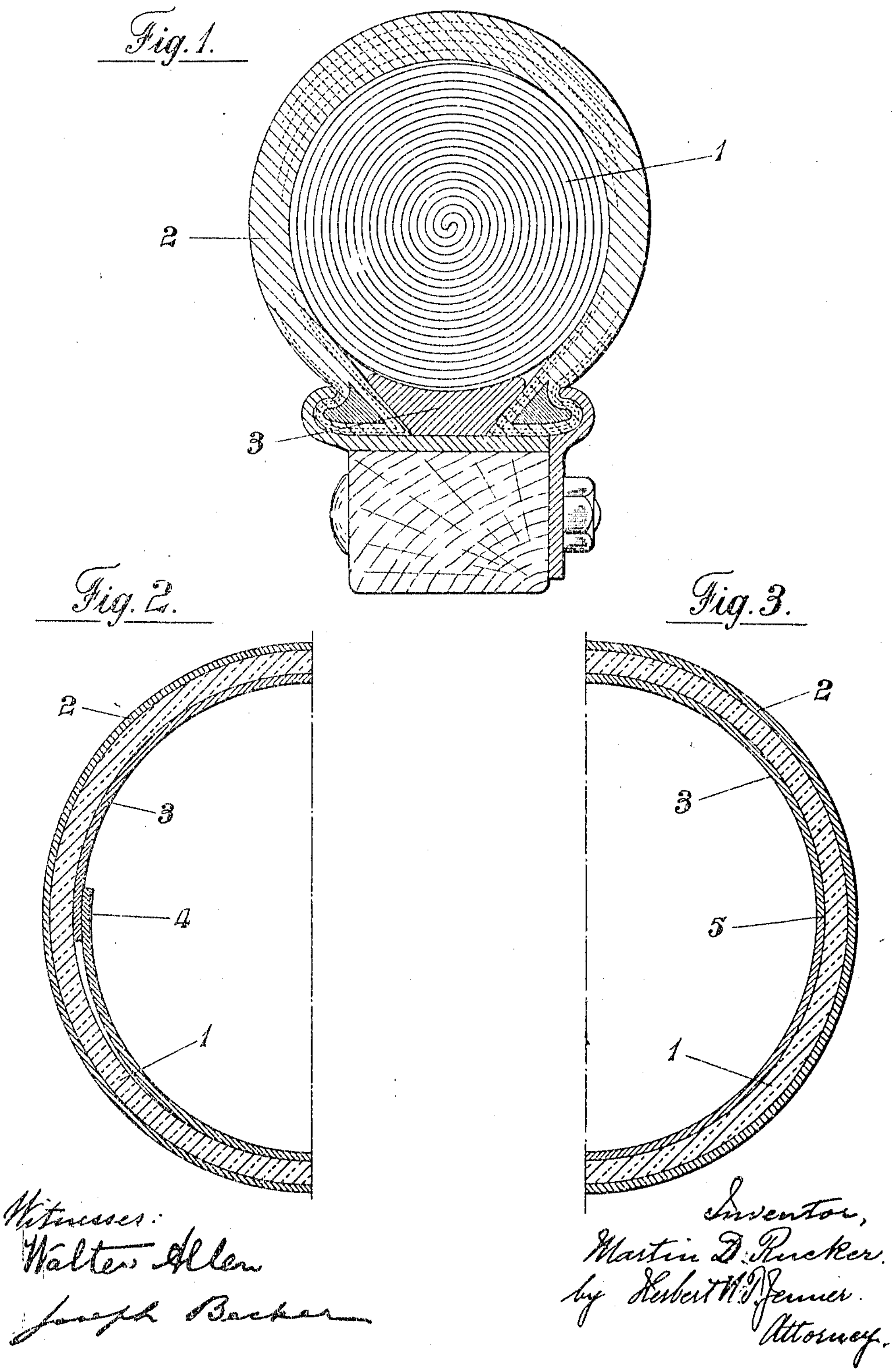

M. D. RUCKER.
TIRE FOR VEHICLES.
APPLICATION FILED JAN. 2, 1914.

1,106,113. Patented Aug. 4, 1914.

Witnesses:
Walter Allen
Joseph Becker

Inventor,
Martin D. Rucker.
by Herbert W. Jenner.
Attorney.

UNITED STATES PATENT OFFICE.

MARTIN DIEDERICH RUCKER, OF PURLEY, ENGLAND.

TIRE FOR VEHICLES.

1,106,113. Specification of Letters Patent. Patented Aug. 4, 1914.

Application filed January 2, 1914. Serial No. 809,946.

*To all whom it may concern:*

Be it known that I, MARTIN DIEDERICH RUCKER, residing at Purley, Surrey, England, have invented certain new and useful Improvements in Tires for Vehicles; and I do hereby declare the following to be a full, clear, and exact description of the invention, such as will enable others skilled in the art to which it appertains to make and use the same.

This invention relates to improvements in tires for vehicles, and has more particular reference to that class which is known as energized, and in which a solid core formed by a plurality of india-rubber windings under tension replaces the usual inner tube of a pneumatic tire.

It is a matter of some difficulty to arrange these cores within the cover, not only because the cover and core require to be secured within a rim, but because it is absolutely essential that no creep or slip take place relatively between these component parts of the tire. So great has been this difficulty that in some cases it has been necessary to apply an adhesive between the parts whereby to all practical purposes the core and cover lose their separate identity and their respective functions are impaired. For instance the core being compressible with a high factor of resilience it is desirable that the resiliency be maintained; a good deal of it however is lost when an adhesive is applied incorporating it with the cover, because the latter relatively speaking is non-resilient and incapable of any great degree of tread flexure, owing to the canvas incorporated in the carcass of the cover. Again if the cover be made flexible and extensible it is difficult to force the combined core and cover within a rim, and it has been proposed to employ an auxiliary rim which can be secured in position, while the core and cover are held in their relative positions by cramps. In any case it is necessary to have a seating to fill up the space between the core and the rim otherwise the resiliency of the core is impaired, and this seating must be capable of outward radial expansion if the core is to be forced within the cover. Heretofore it has been customary to articulate this seating so that a series of openings occur at equi-spaced intervals, and although there is little if any tendency of the core to be pinched through any movement of the seating parts, yet a plurality of independent pieces such as this construction entails is not highly desirable in tire manufacture.

Now according to the present invention the seating is formed all in one piece, but is capable of circumferential distention, so that the core which sits upon it can be forced within the cover, the latter being extensible to accommodate same. Hence if the seating be prevented from collapse at its maximum extension, neither the core, cover nor seating can move since they are relatively locked, the tension-wound core being under compression between the cover and seating; if now the cover has inextensible beads then the tire can be placed in the rim with ease if a divided rim or detachable flange be employed without the necessity of employing cramps, or using an auxiliary rim.

The invention will now be described more particularly with reference to the accompanying drawings, in which:—

Figure 1 is a section of the tire fitted with the expansible seating, Fig. 2 is a sectional side view of the tire showing the seating with ends overlapping before being expanded, Fig. 3 is a sectional side view of the tire showing the seating expanded and the ends locked.

In the drawings, 1 is the solid core of the tire, inclosed in the cover 2, and resting on the expansible seating 3. This seating is made from flexible steel, aluminium, vulcanite, or other suitable material, and its section is suitably shaped so as to form a good support for the core 1. The seating may be either solid or of hollow section and is formed in a discontinuous length and bent into a circular hoop, which is arranged within the tire, with the ends overlapping as shown at 4 Fig. 2.

In operation the core 1 is placed over the seating 3, the ends being caused to overlap if necessary, to allow the easy fitting of the core. The cover 2 is now placed in position over the core and the seating and core expanded radially by any suitable means until the ends of the seating cease to overlap and abut as shown at 5 in Fig. 3. In this position the core and cover are held in very close contact and cannot move relatively, the seating retaining these parts continuously in their correct relationship. If the cover be made extensible then there is some latitude allowable between the diameter of the seating when its ends abut and the core distention, but if the cover be of the canvas type, then the seating diameter must be calculated to compress the core within the cover to fully distend the latter, by the time that its ends abut. It is highly preferable therefore, for this reason if for no other, that the cover be made mainly of rubber, and of an extensible character. The seating may of course be anchored to the rim with a security stud or like device in any well known manner.

I claim:—

1. In a tire for vehicles having a cover and an inner core the combination therewith of an expansible seating adapted to receive the core, and when expanded with the ends abutting, to retain the core and cover in fixed relationship.

2. In a tire for vehicles, means for keeping the cover and core in position relative to each other, consisting of a seating having the ends overlapping for assembly, said seating being capable of expansion until the said ends meet and abut, thereby locking the seating in position relative to the tire parts, substantially as described and illustrated.

In testimony whereof I affix my signature, in presence of two witnesses.

MARTIN DIEDERICH RUCKER.

Witnesses:
H. D. JAMESON,
S. E. BOURÉ.